Figure 1:
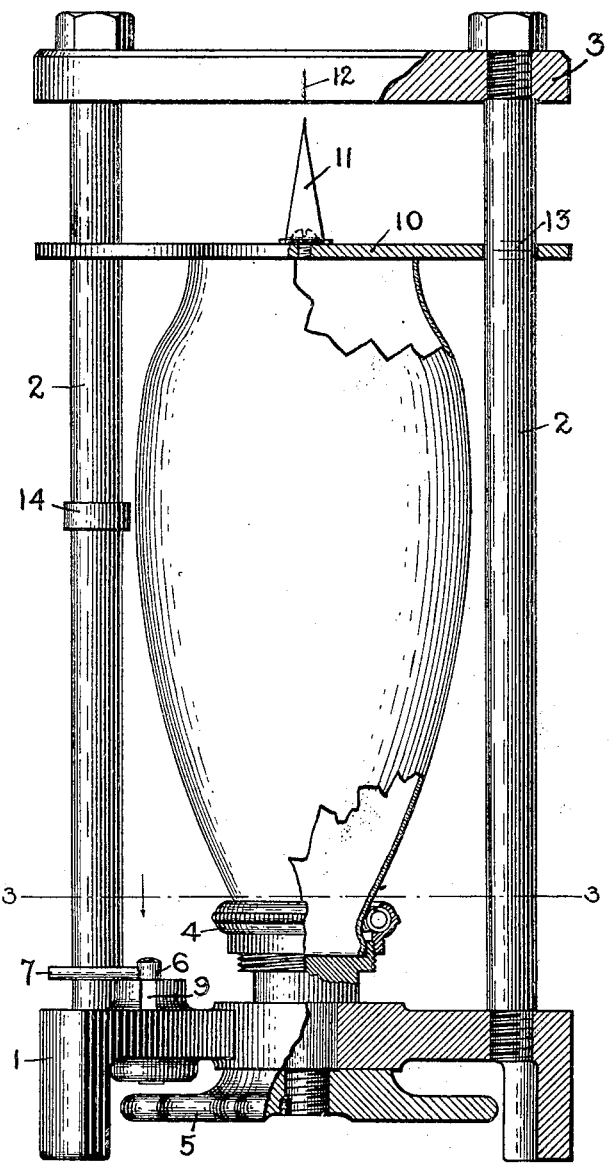

No. 801,412. PATENTED OCT. 10, 1905.
H. C. SPINNEY.
GLOBE TESTER.
APPLICATION FILED MAR. 3, 1903.

2 SHEETS—SHEET 2.

Witnesses:

Inventor,
Henry C. Spinney,
By Albert G. Davis
Att'y.

UNITED STATES PATENT OFFICE.

HENRY CLINTON SPINNEY, OF LYNN, MASSACHUSETTS, ASSIGNOR TO GENERAL ELECTRIC COMPANY, A CORPORATION OF NEW YORK.

GLOBE-TESTER.

No. 801,412.      Specification of Letters Patent.      Patented Oct. 10, 1905.

Application filed March 3, 1903. Serial No. 145,919.

*To all whom it may concern:*

Be it known that I, HENRY CLINTON SPINNEY, a citizen of the United States, residing at Lynn, county of Essex, State of Massachusetts, have invented certain new and useful Improvements in Globe-Testers, of which the following is a specification.

This invention relates to a device for testing inner globes of inclosed arc-lamps to ascertain whether they are of the proper size and shape, and if not whether the variation is too great to permit of using the globe in a lamp.

In inclosed arc-lamps the inner globe is closed at its upper end against the admission of air by a cap which rests upon the upper edge of the globe and which in some types has a loop on one side extending over a stationary suspension-hook. The importance, therefore, of having the globe of the proper height is obvious, for if, for instance, it were short the suspension-hook would hold the cap up off of the globe on one side. The cap that closes the upper end of the globe has a central bore through which the upper carbon extends, and owing to the necessity for keeping the inner globe almost air-tight the clearance allowed between the cap and the carbon is very small. Tilting the cap so that it does not rest at right angles to the carbon therefore has the effect of reducing the size of the opening through which the carbon passes. On account of the small clearance between the cap and the carbon if the former were tilted to only a small extent the carbon would get caught between the sides of the opening and prevent the lamp from feeding. Furthermore, the center line of the bore in the cap must coincide with the axis of the carbon, for otherwise the carbon would not feed or would be guided out of alinement with the lower carbon. The ends of the globe must therefore be ground perfectly true and be perpendicular to the axis of the globe. If the foot or lower end is not true, the center line of the bore will be thrown away from the axis of the carbon, and if the upper end is not true the cap will be tilted, in either case preventing proper feeding of the lamp. I have therefore provided a testing device by which the height and the edges of a globe can be quickly and accurately tested to ascertain whether or not they are true, and if not whether the variation is too great to permit of using the globe in a lamp.

In carrying out my invention I provide a frame carrying a rotatable globe-holder, the seat of which is machined perfectly true and perpendicular to the sides of the frame. A plate is loosely mounted for vertical movement on the sides of the frame and is adapted to rest on the top of the globe. On this plate is secured a pointer or index and when the plate is perpendicular to the sides of the frame the pointer registers with a mark or datum point on the top of the frame. On each side of the frame are three marks. The plate should register with the middle one of these marks when the globe is of the proper height, and the other two marks indicate the maximum and minimum height allowable. On one of the sides of the frame is a loose collar or gage. In using the device a globe is clamped in place and the plate rested on the top of the globe. The position of the plate with reference to the marks on the sides shows whether the height of the globe is proper. The globe is then rotated by a hand-nut attached to the globe-holder, and if the lower foot is not true the upper part of the globe will approach and recede from each side of the frame alternately. If this occurs, the gage is run up on the side of the frame when the globe is nearest that side, and unless it can pass the globe must be rejected. As the globe is rotated the pointer is watched, and if the upper end of the globe is not true it will be indicated by the pointer leaving the mark on the top of the frame.

My invention therefore embraces a testing device for globes or similar articles having means for determining irregularities of height or shape. The novel features of the invention will be fully described hereinafter, and definitely pointed out in the appended claims.

Figure 2:
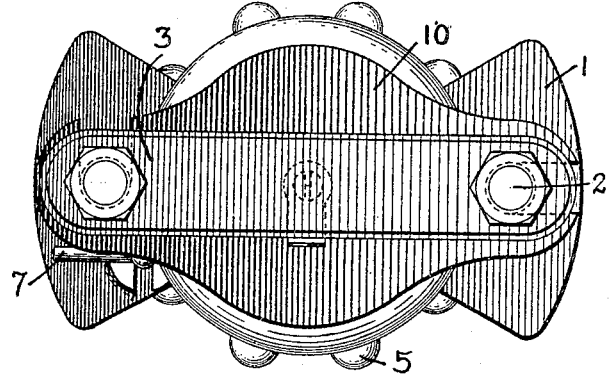
Figure 3:
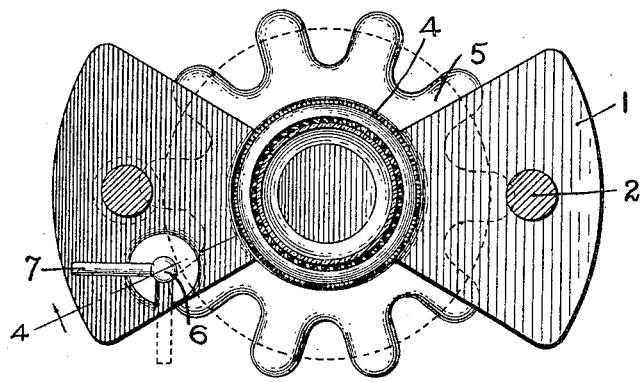
Figure 4:
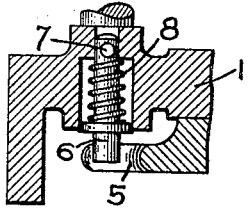

In the accompanying drawings, which illustrate one embodiment of my invention, Figure 1 is an elevation, partly in section, of the testing device. Fig. 2 is a top view. Fig. 3 is a section on line 3 3 of Fig. 1 looking downward, and Fig. 4 is a section of part of one side of the device on line 4 of Fig. 3.

Referring to Fig. 1, 1 indicates the base of the frame, to which are secured the side rods 2 2. These rods are perpendicular to the base 1 and are connected at their upper extremities by the top piece 3 of the frame. Mounted in the middle of the base 1 is a globe-holder 4, adapted to be rotated by the hand-nut 5, the edge of which is provided with a number of fingers, as shown in Fig. 3. The supporting-surface of the globe-holder is machined accurately, so that it is exactly perpendicular to the side rods 2 2. A spring-pressed stop-pin 6, having a handle 7, is mounted on the base and arranged to be pressed downwardly by a spring 8. In the bearing of the stop-pin is a slot 9, into which the handle 7 may slide. When the handle is turned so that it comes over the slot, the spring throws the pin downward and its end, projecting between two fingers of the hand-nut 5, prevents the globe-holder from turning. This is necessary while securing a globe in its seat, for otherwise the entire globe-holder would turn. The plate 10 is loosely mounted on the side rods 2 2, so that it can move freely up and down and tilt somewhat if the globe is not true, and at its center is secured an index or pointer 11. On the top 3 of the frame is a mark 12, which indicates the position of the point of the index when the plate rests on the top of the globe and is perpendicular to the side rods. On each side rod are three marks, as indicated at 13, so positioned that when the globe is of the proper height and the plate 10 is resting on its upper end the top of plate 10 will coincide with the middle mark. The upper and lower marks indicate the maximum and minimum allowable height, so that if the top of plate 10 is above the upper or below the lower mark the globe must be rejected. Loosely mounted on one of the side rods 2 2 is a collar or gage 14.

In using the testing device a globe is secured in its seat, the stop-pin 6 having first been dropped to prevent the globe-holder from turning. The plate 10 is then placed on the upper end of the globe. By noting the position of the plate relative to the marks on the side rods the height of the globe can be ascertained immediately. The stop-pin is then raised and turned so that the handle 7 is away from the slot 9 and the globe is rotated by means of the hand-nut 5. The operator watches the movements of the globe in the frame, and if the side of the globe approaches and recedes from the side rods the base is not true. By sliding the gage 14 up on the side rod the crookedness of the base can be tested, for if the gage cannot pass freely from the bottom to the top of the side rod when the side of the globe is nearest the rod the globe must be rejected. If the base is true, the operator then watches the index 11 while he rotates the globe. If the top is true, the pointer will not vary from line 12; but if it does move from the line the globe must be rejected, as then the cap would not be held perpendicular to the carbon if the globe were used in a lamp and the carbon would not feed.

What I claim as new, and desire to secure by Letters Patent of the United States, is—

1. A testing device comprising a frame, a revoluble seat mounted thereon, means for locking the article to be tested in said seat, a plate adapted to rest on the article, and means for indicating the angular position of the plate.

2. A testing device comprising a frame having a base and sides and marks on the sides, a revoluble seat mounted on the base, means for locking the article to be tested in the seat, and a plate adapted to rest on the article and movable on the sides of the frame to coöperate with said marks.

3. A testing device comprising a frame having a datum-point thereon, a revoluble seat mounted on the base of the frame, means for locking the article to be tested in the seat, a loosely-mounted plate adapted to rest on the article and movable on the sides of the frame, and a pointer mounted on the plate coöperating with said datum-point.

4. A testing device comprising a frame having a base and sides, a revoluble seat mounted on the base, the supporting-surface of which is perpendicular to one of the sides, means for locking the article to be tested in the seat, and a gage loosely mounted on said side of the frame.

5. A testing device comprising a frame having a base and sides, a revoluble seat mounted on the base, means for locking the article to be tested in the seat, a plate adapted to rest on the article and movable on the sides of the frame, and a gage loosely mounted on one of the sides.

6. A device for testing globes, comprising a frame, a rotatable globe-seat mounted on the base of the frame, a movable plate carried by the sides of the frame and adapted to rest on the top of the globe, and means for indicating whether or not the plate is perpendicular to the sides of the frame.

7. A device for testing globes, comprising a frame having marks thereon, a rotatable globe-seat on the base of the frame, means for locking the globe-seat against rotation, a plate adapted to rest on the upper end of the globe, and an index carried by the plate, said plate and index coöperating with said marks.

In witness whereof I have hereunto set my hand this 28th day of February, 1903.

HENRY CLINTON SPINNEY.

Witnesses:
DUGALD McK. McKILLOP,
JOHN J. WALKER.